US009475543B1

(12) United States Patent
Chou (10) Patent No.: US 9,475,543 B1
(45) Date of Patent: Oct. 25, 2016

(54) PEDAL SCOOTER TRANSMISSION MECHANISM

(71) Applicant: Shui-Chuan Chou, Taipei (TW)

(72) Inventor: Shui-Chuan Chou, Taipei (TW)

( * ) Notice: Subject to any disclaimer, the term of this patent is extended or adjusted under 35 U.S.C. 154(b) by 0 days.

(21) Appl. No.: 14/965,911

(22) Filed: Dec. 11, 2015

(30) Foreign Application Priority Data

Jun. 11, 2015 (TW) .............................. 104209343 U (51) Int. Cl.
*B62M 1/24* (2013.01)
*B62M 9/02* (2006.01)
*B62K 3/00* (2006.01)
*B62M 1/26* (2013.01)

(52) U.S. Cl.
CPC ................ *B62M 1/24* (2013.01); *B62K 3/002* (2013.01); *B62M 1/26* (2013.01); *B62M 9/02* (2013.01)

(58) Field of Classification Search
CPC ........... B62M 1/24; B62M 1/26; B62M 1/28
USPC ....................................................... 280/258
See application file for complete search history.

(56) References Cited

U.S. PATENT DOCUMENTS

| 1,799,947 | A | * | 4/1931 | Benjamin | B62M 11/00 280/221 |
|---|---|---|---|---|---|
| 2,466,105 | A | * | 4/1949 | Hoffman | B62K 3/002 280/221 |
| 4,846,488 | A | * | 7/1989 | Szadkowski | B62M 1/28 280/214 |
| 7,621,547 | B1 | * | 11/2009 | Fan | B62K 3/002 280/210 |
| 8,210,553 | B2 | * | 7/2012 | Fan | B62K 3/002 280/221 |
| 2007/0024019 | A1 | * | 2/2007 | Tarlow | B62M 1/24 280/221 |
| 2012/0013097 | A1 | * | 1/2012 | Fan | B62K 3/002 280/221 |

* cited by examiner

*Primary Examiner* — Tony H. Winner
*Assistant Examiner* — Michael Stabley (57) ABSTRACT

A pedal scooter transmission mechanism capable of increasing more motion energy in the pedal scooter, comprising a driving chainring pivotally connected to a proximity of a middle section of the deck, wherein the driving chainring is connected with the driven chainring via a transmission element, whereby the rear wheel and the driven chainring are being driven; two pedal mechanisms, every pedal mechanism comprising a pedal which is horizontally installed on both sides the deck near the middle section, and drives the center axle by a driving connecting rod assembly, wherein the total length of driving connecting rod assemblies is different, so that one of the pedal can generate more torque force and make the pedal scooter produce more motion energy.

17 Claims, 7 Drawing Sheets

PEDAL SCOOTER TRANSMISSION MECHANISM

FIELD OF THE INVENTION

The present invention relates to a pedal scooter transmission mechanism.

BACKGROUND OF THE INVENTION

A Scooter has features of simple structure, low price and easy maintenance, which are more popular for customers. To apply force in use any of the feet towards the ground and push the scooter continues to slide is an inconvenient operation, it may cause dangerous by improper operation. The inventor had invented the prior art (Taiwan patent number: M383531) to solve the above mentioned problems, but the prior art still have some disadvantages of uneasy operation, complex structure, inconvenience of assembly and maintenance, higher manufacturing cost.

In view of this, the present invention overcomes these difficulties.

SUMMARY OF INVENTION

The purpose of the present invention is to provide a pedal scooter transmission mechanism, the transmission mechanism applied in a pedal scooter, the pedal scooter comprising: a deck; a front tube disposed in a front end of the deck; a front fork disposed on the front tube; a handle disposed at a top end of the front fork; at least a front wheel disposed at a bottom end of the front fork, whereby the handle can control the direction of the front wheel through the front fork; a rear fork disposed at a rear end of the deck; and at least a rear wheel disposed at a bottom end of the rear fork, wherein the rear wheel comprises a driven chainring disposed at a center thereof, whereby the front wheel and the rear wheel can be rotated on the ground when supporting the deck and loading thereon; the transmission mechanism comprising: a driving chainring having a center axle pivotally connected to a proximity of a middle section of the deck, wherein the driving chainring is connected with the driven chainring via a transmission element, when the center axle drives the driving chainring to rotate, the driving chainring further drives the driven chainring to rotate by mean of the transmission element; a left pedal mechanism, comprising a left pedal, a left parallel connecting rod assembly, and a left driving connecting rod assembly; wherein the left parallel connecting rod assembly having one end thereof is respectively connected to the left pedal near a front end and a rear end, and the opposite end thereof respectively connected to the deck adjacent to the front end and the rear end, whereby the left pedal can be pivotally installed on the deck adjacent to a left middle section; wherein the left driving connecting rod assembly having adjacent ends thereof is connected to each other and non-adjacent ends thereof is respectively connected to the left pedal near a middle section and the center axle; and a right mechanism, comprising a right pedal, a right parallel connecting rod assembly, and a right driving connecting rod assembly; wherein the right parallel connecting rod assembly having one end thereof is respectively connected to the right pedal adjacent to a front end and a rear end, and having the opposite end thereof respectively connected to the deck adjacent to the front end and the rear end, whereby the right pedal can be pivotally installed on the deck adjacent to a right middle section; wherein the right driving connecting rod assembly having adjacent ends thereof is connected to each other, and having the opposite ends thereof is respectively connected to the right pedal adjacent to a middle section and the center axle, when riding the pedal scooter, the rider not only can push the pedal scooter and let it move by inertia force, but also can step with both feet on the left pedal or the right pedal, then the torque force is repeatedly imposed on the center axle and the driving chainring respectively through the corresponding left first and second driving rods, and the right first and second driving rods, at this point, in order to balance the left pedal and the right pedal, the rider will impose different force on both feet due to different total length in the left driving connecting rod assembly and the right driving connecting rod assembly, so the rider will unconsciously impose more force on one of the pedals, making the left pedal or the right pedal further imposes more torque force to the center axle, and leading the driving chainring with more torque force via the transmission element to bring the driven chainring and the rear wheel to rotate, such that the pedal scooter can keep moving forward with more motion energy.

DETAILED DESCRIPTION OF THE PREFERRED EMBODIMENTS

Figure 1:
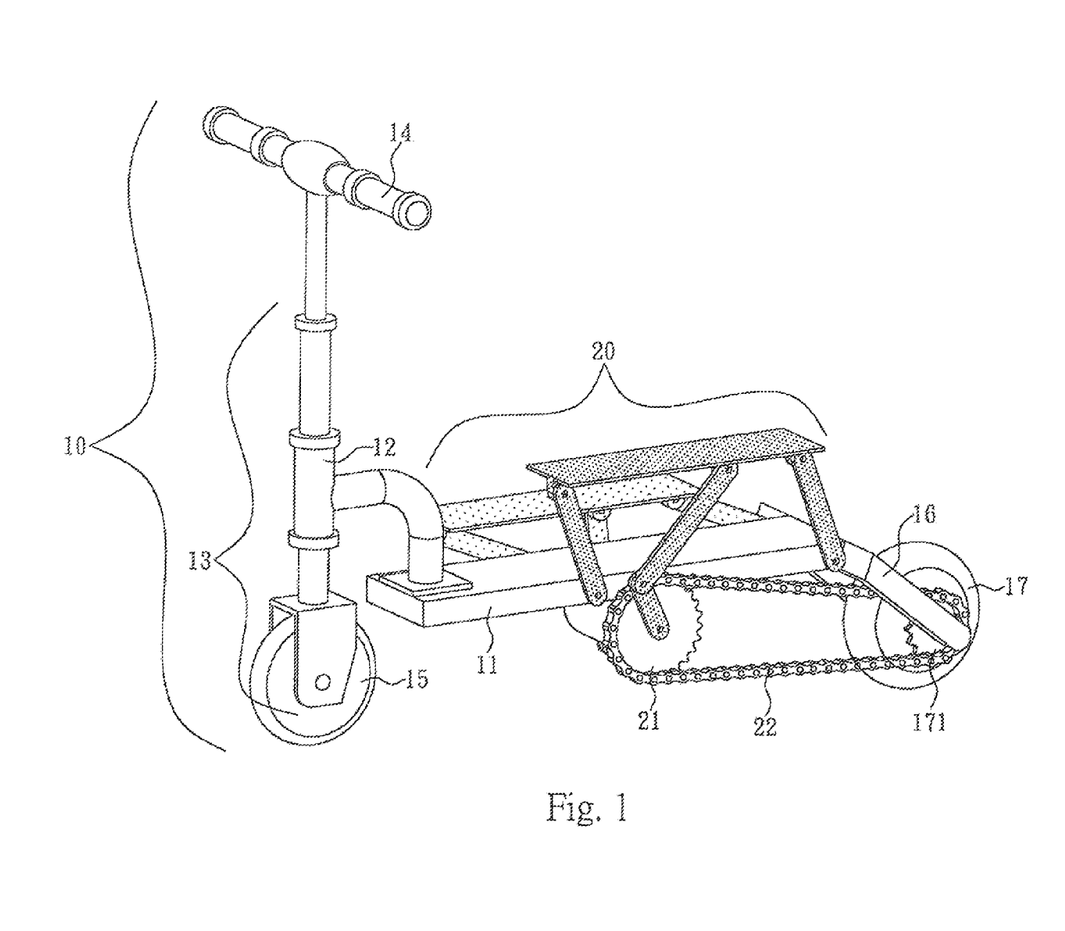
FIG. 1 is a schematic view of a scooter and a transmission mechanism of a first embodiment in the present invention.

A first embodiment of the present invention, as is shown in FIG. 1, a pedal scooter transmission mechanism, the transmission mechanism (20) applied in a pedal scooter (10), the pedal scooter (10) comprising: a deck (11); a front tube (12) disposed in a front end of the deck (11); a front fork (13) disposed on the front tube (12); a handle (14) disposed at a top end of the front fork (13); at least a front wheel (15) disposed at a bottom end of the front fork (13), whereby the handle (14) can control the direction of the front wheel (15) through the front fork (13); a rear fork (16) disposed at a rear end of the deck (11); and at least a rear wheel (17) disposed at a bottom end of the rear fork (16), wherein the rear wheel (17) comprises a driven chainring (171) disposed at a center thereof, whereby the front wheel (15) and the rear wheel (17) can be rotated on the ground when supporting the deck (11) and loading thereon, for example the weight of a rider.

Figure 2:
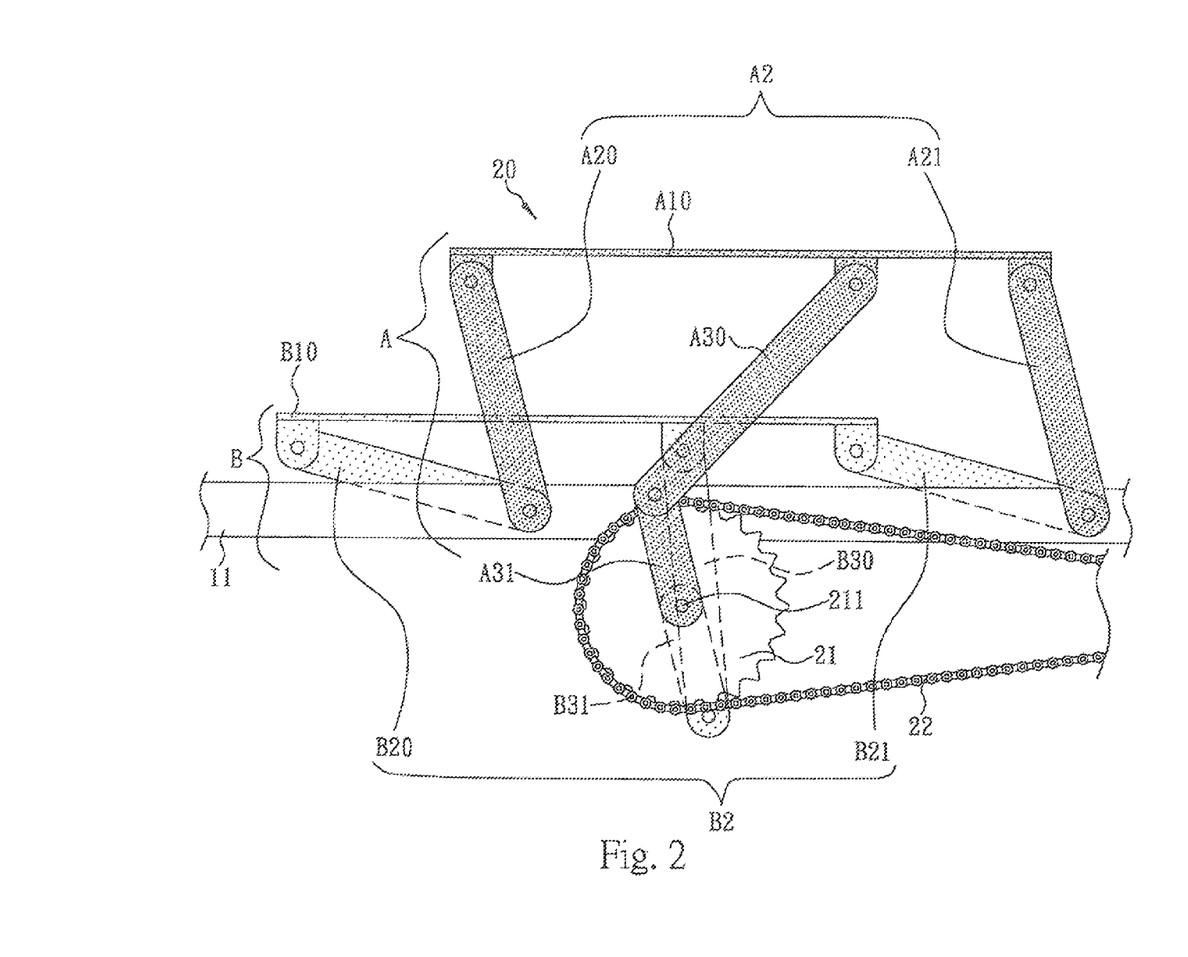
FIG. 2 is a partial schematic view of the first embodiment in the present invention.

Referring to FIG. 1 and FIG. 2, the transmission mechanism (20) comprising:

a driving chainring (21) having a center axle (211) pivotally connected to a proximity of a middle section of the deck (11) and a pedal assembly mechanism, wherein the driving chainring (21) is connected with the driven chainring (171) via a transmission element (22), when the center axle (211) drives the driving chainring (21) rotating, the driving chainring (21) further drives the driven chainring rotating by the transmission element (22); wherein the pedal assembly mechanism comprises a left pedal mechanism (A) and a right pedal mechanism (B); wherein the left pedal mechanism (A) comprises a left pedal (A10), a left parallel connecting rod assembly (A2), and a left driving connecting rod assembly (A3); wherein the right mechanism (B), comprising a right pedal (B10), a right parallel connecting rod assembly (B2), and a right driving connecting rod assembly (B3); wherein the left parallel connecting rod assembly (A2) comprises a left first parallel rod (A20) pivotally connected with the corresponding left pedal (A10) adjacent to the front end and a left second parallel rod (21) pivotally connected with the corresponding left pedal (A10) adjacent to the rear end; wherein the right parallel connecting rod assembly (B2) comprises a right first parallel rod (B20) pivotally connected with the corresponding right pedal (B10) adjacent to the front end and a right second parallel rod (B21) pivotally connected with the corresponding right pedal (B10) adjacent to the rear end; wherein the left driving connecting rod assembly (A3) comprises a left first driving rod (A30) and a left second driving rod (A31); wherein the right driving connecting rod assembly (B3) comprises a right first driving rod (B30) and a right second driving rod (B31). Wherein one end of the left first and second parallel rods (A20, A21) is pivotally connected with the left pedal (A10) adjacent to the front end and rear end, and the opposite end thereof is pivotally connected with the deck (11) adjacent to the front end and rear end so that the left pedal (A10) can be pivotally installed in the proximity of the middle section of the deck (11); wherein one end of the right first and second parallel rods (B20, B21) is pivotally connected with the right pedal (B10) adjacent to the front end and rear end, and the opposite end thereof is pivotally connected with the deck (11) adjacent to the front end and rear end so that the right pedal (B10) can be pivotally installed in the proximity of the middle section of the deck (11). The left first and second driving connecting rods (A30, A31) are connected at adjacent ends, and the non-adjacent ends thereof are respectively connected to the left pedal (A10) near a middle section and the center axle (211); The right first and second driving connecting rods (B30, B31) are connected at adjacent ends, and the non-adjacent ends thereof are respectively connected to the right pedal (B10) near a middle section and the center axle (211). The total length of the left first and second driving connecting rod (A30, A31) of the left pedal mechanism (A) is different from the one of the right first and second (B30, B31) of the right pedal mechanism (B), whereby the left pedal (A10) can generate different torque force from the right pedal (B10).

Wherein the length of the left second driving rod (A31) is the same as the right second driving rod (B31); wherein the length of the left first driving rod (A30) is different from the one of the right first driving rod (B30).

Every time when a rider steps on the left pedal (A10) and right pedal (B10), the different torque force to the center axle (211) can be generated respectively by the left first and second driving connecting rods (A30, A31), and the first and second right driving connecting rods (B30, B31).

Referring to FIG. 1 and FIG. 2 again, when riding the pedal scooter (10), the rider not only can push the pedal scooter (10) and let it move by inertia force, but also can step with both feet on the left pedal (A10) or the right pedal (B10), then the torque force is repeatedly imposed on the center axle (211) and the driving chainring (21) respectively through the corresponding left first and second driving rods (A30, A31), and the right first and second driving rods (B30, B31), at this point, in order to balance the left pedal (A10) and the right pedal (B10), the rider will impose different force on both feet due to different total length in the left driving connecting rod assembly (A3) and the right driving connecting rod assembly (B3), so the rider will unconsciously impose more force on one of the pedals, making the left pedal (A10) or the right pedal (B10) further imposes more torque force to the center axle (211), and leading the driving chainring (21) with more torque force via the transmission element (22) to bring the driven chainring (171) and the rear wheel (17) to rotate, such that the pedal scooter (10) can keep moving forward with more motion energy.

In the above-mentioned embodiment of the present invention as shown in FIGS. 1 and 2, the driven chainring (171) and the driving chainring define a gear wheel, and the transmission element (22) defines a chain, when the center axle (211) drives the driving chainring (21) to rotate, the driving chainring (21) further drives the driven chainring to rotate by mean of the transmission element (22).

In another embodiment of the present invention, the driven chainring (171) and the driving chainring define a belt wheel, and the transmission element (22) defines a belt, whereby the driving chainring (21) is also can drive the driven chainring (171), which have the same effect as the gear wheel.

When the actual operation, it can also, as required, replace the gear wheel or the belt with other transmission element, such as a gear assembly, As long as the other component can make the driving chainring (21) drive the driven chainring (171), it is the transmission element (22) of the present invention.

In addition, in the previous embodiments, as shown in FIG. 2, the one end of the left first and second parallel rod (A20, A21) pivotally connected with a bottom surface of the left pedal (A10) where the front end and the rear end would preferably be located; the one end of the right first and second parallel rod (B20, B21) pivotally connected with a bottom surface of the right pedal (B10) where the front end and the rear end would preferably be located. The left first driving connecting rod (A30) having one end thereof pivotally connected with the left pedal (A10) where a middle section would preferably be located.

Moreover, in a preferable embodiment, the length of the left first parallel connecting rod (A20) connected to the left pedal (A10) near the front end is the same as the length of the left second parallel connecting rod (A21) connected to the left pedal (A10) near the rear end, so that the left pedal (A10) can be horizontally installed on the left side the deck (11) near the middle section; the length of the right first parallel connecting rod (B20) connected to the right pedal (B10) near the front end is the same as the length of the right second parallel connecting rod (B21) connected to the right pedal (B10) near the rear end, so that the right pedal (B10) can be horizontally installed on the right side the deck (11) near the middle section.

When the actual operation, it can also, as required, make the length of the left first parallel connecting rod (A20) connected to the left pedal (A10) near the front end is shorter than the length of the left second parallel connecting rod (A21) connected to the left pedal (A10) near the rear end; and make the length of the right first parallel connecting rod (B20) connected to the right pedal (B10) near the front end is shorter than the length of the right second parallel connecting rod (B21) connected to the right pedal (B10) near the rear end, so that the left pedal (A10) and the right pedal can be installed forward on both sides of the deck (11) near the middle section for the convenience of the rider to step thereon.

Figure 3:
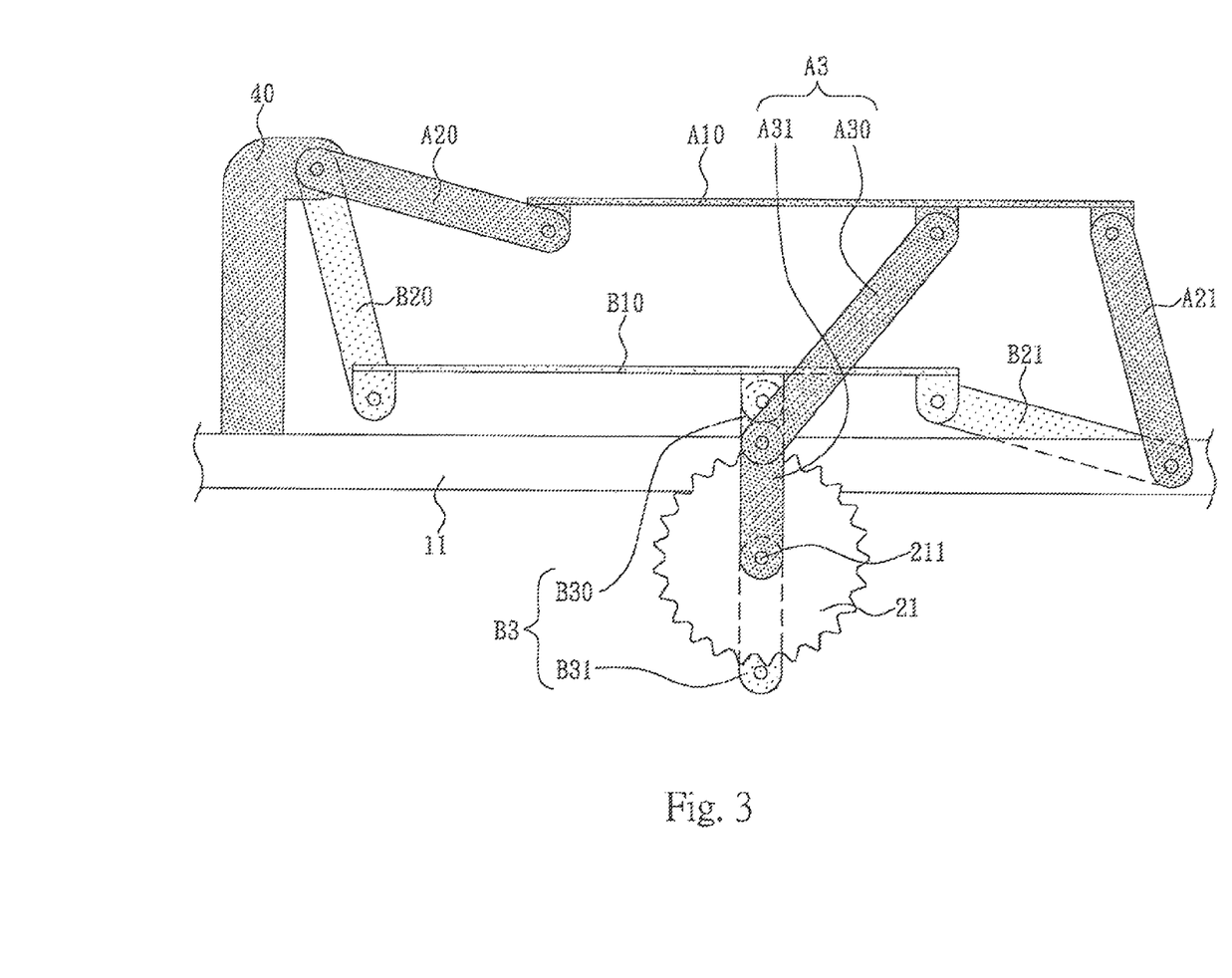
FIG. 3 is a partial schematic view of a second embodiment in the present invention.

A second embodiment as shown in FIG. 3, the deck (11) further comprises a front supporting post (40) disposed on a top surface thereof near the front end, one end of the left first and second parallel rod (A20, A21) is respectively installed on the bottom surface of the left pedal (A10) near the front end and the rear end, and the opposite end thereof is respectively installed on the front supporting post (40) near a top end and the deck (11) near the rear end, the non-adjacent ends of the left first driving rod (A30) and the left second driving rod (A31) are respectively connected to the bottom surface of the left pedal (A10) near the middle section and the center axle (211); and one end of the right first and second parallel rod (B20, B21) is respectively installed on the bottom surface of the right pedal (B10) near the front end and the rear end, and the opposite end thereof is respectively installed on the front supporting post (40) near a top end and the deck (11) near the rear end, the non-adjacent ends of the right first driving rod (B30) and the right second driving rod (B31) are respectively connected to the bottom surface of the right pedal (B10) near the middle section and the center axle (211).

When the actual operation, it can also, as required, make one end of the left first and second parallel rod (A20, A21) is respectively installed on the top surface of the left pedal (A10) near the front end and the rear end; and one end of the right first and second parallel rod (B20, B21) is respectively installed on the top surface of the right pedal (B10) near the front end and the rear end.

Figure 4:
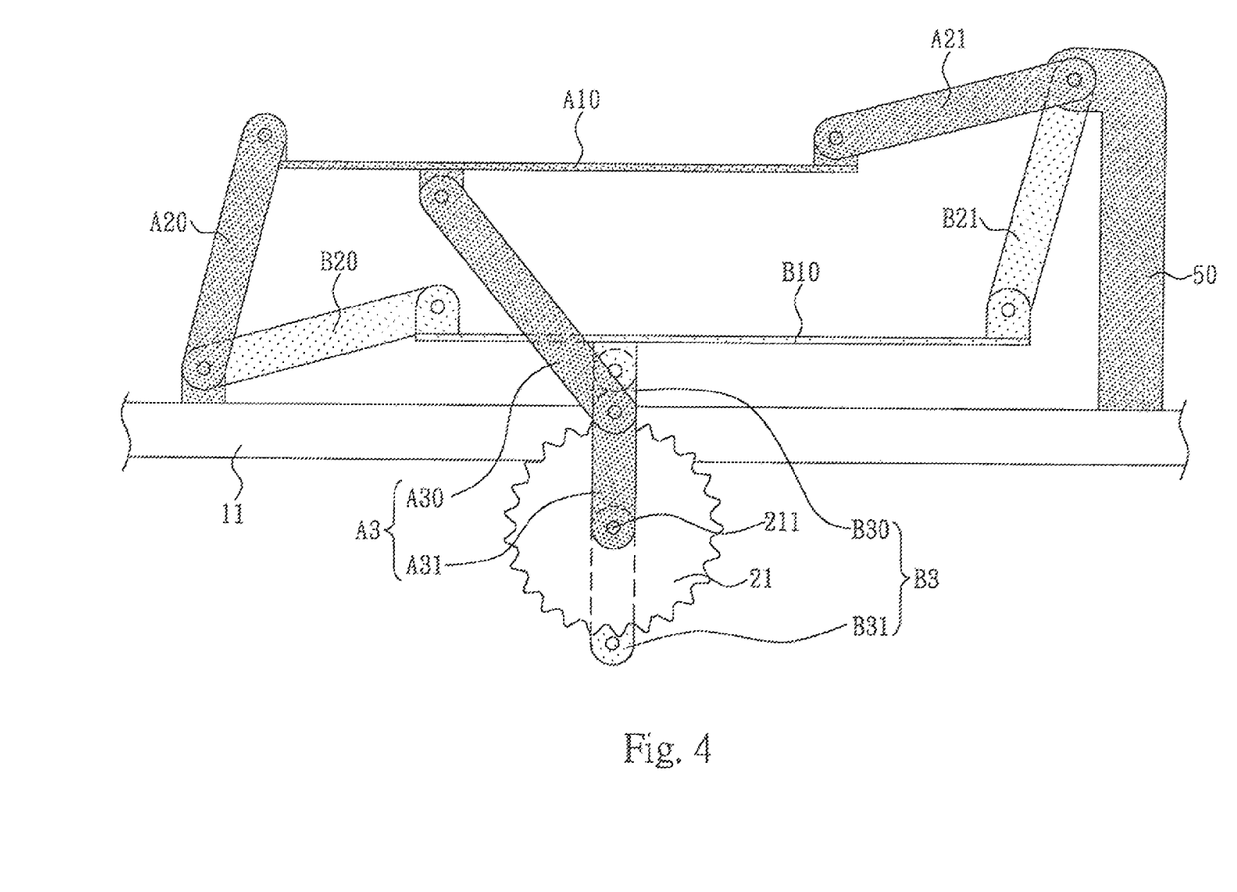
FIG. 4 is a partial schematic view of a third embodiment in the present invention.

A third embodiment as shown in FIG. 4, the deck (11) further comprises a rear supporting post (50) disposed on the top surface thereof near the rear end, one end of the left first and second parallel rod (A20, A21) is respectively installed on the top surface of the left pedal (A10) near the front end and the rear end, and the opposite end thereof is respectively installed on the rear supporting post (50) near a top end and the deck (11) near the front end, the non-adjacent ends of the left first driving rod (A30) and the left second driving rod (A31) are respectively connected to the bottom surface of the left pedal (A10) near the middle section and the center axle (211); and one end of the right first and second parallel rod (B20, B21) is respectively installed on the top surface of the right pedal (B10) near the front end and the rear end, and the opposite end thereof is respectively installed on the rear supporting post (50) near the top end and the deck (11) near the front end, the non-adjacent ends of the right first driving rod (B30) and the right second driving rod (B31) are respectively connected to the bottom surface of the right pedal near the middle section and the center axle (211).

When the actual operation, it can also, as required, make one end of the left first and second parallel rod (A20, A21) is respectively installed on the bottom surface of the left pedal (A10) near the front end and the rear end; and one end of the right first and second parallel rod (B20, B21) is respectively installed on the bottom surface of the right pedal (B10) near the front end and the rear end.

Figure 5:
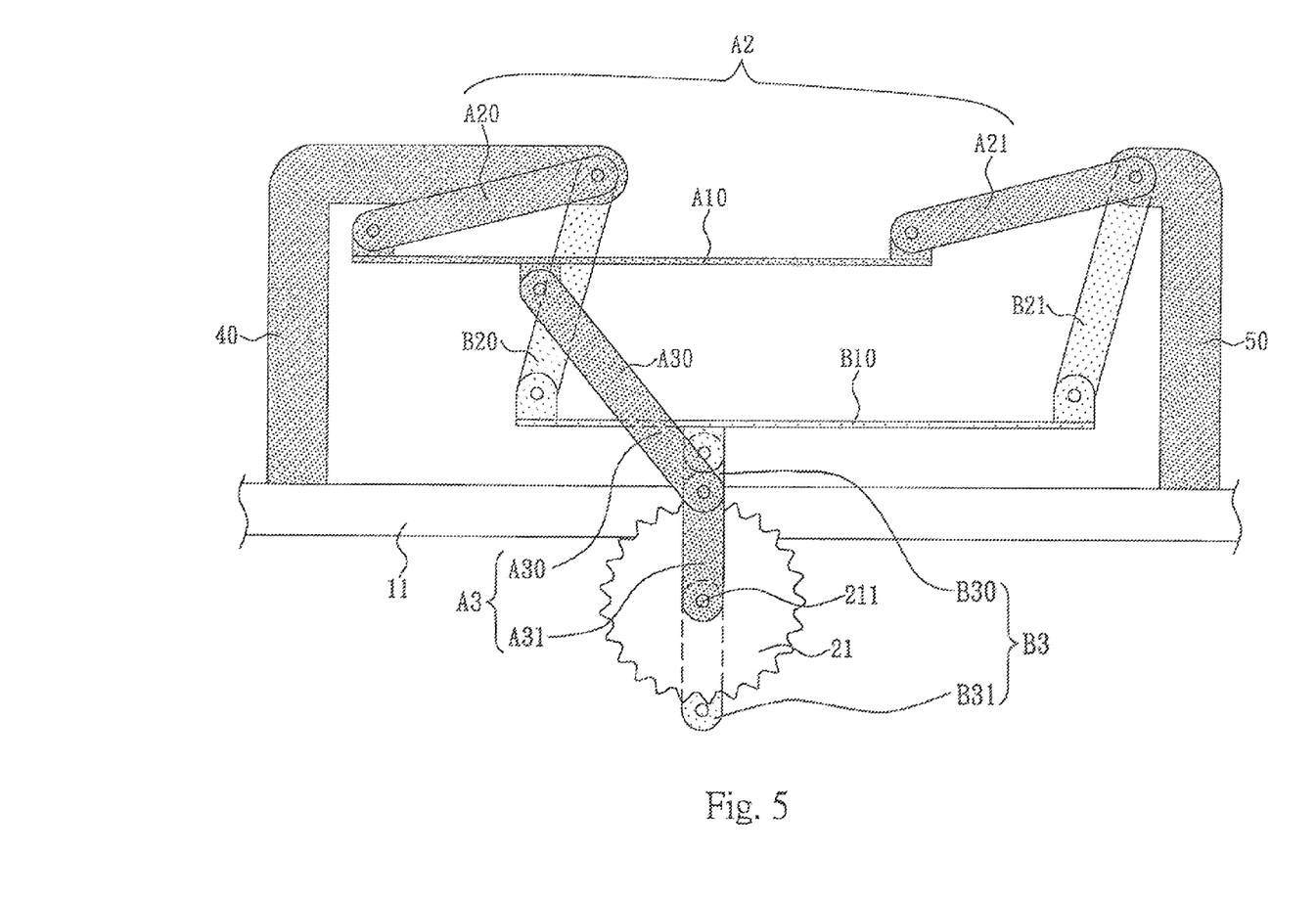
FIG. 5 is a partial schematic view of a forth embodiment in the present invention.

A fourth embodiment as shown in FIG. 5, the deck (11) further comprises a front supporting post (40) and a rear supporting post (50) respectively disposed on the top surface thereof near the front end and the rear end, one end of the left first and second parallel rod (A20, A21) is respectively installed on the top surface of the left pedal (A10) near the front end and the rear end, and the opposite end thereof is respectively installed on the front supporting post (40) near the top end and the rear supporting post (50) near top end, the non-adjacent ends of the left first driving rod (A30) and the left second driving rod (A31) are respectively connected to the bottom surface of the left pedal (A10) near the middle section and the center axle (211); one end of the right first and second parallel rod (B20, B21) is respectively installed on the top surface of the right pedal (B10) near the front end and the rear end, and the opposite end thereof is respectively installed on the front supporting post (40) near the top end and the rear supporting post (50) near top end, the non-adjacent ends of the right first driving rod (B30) and the right second driving rod (B31) are respectively connected to the bottom surface of the right pedal (B10) near the middle section and the center axle (211);

When the actual operation, it can also, as required, make one end of the left first and second parallel rod (A20, A21) is respectively installed on the bottom surface of the left pedal (A10) near the front end and the rear end; and one end of the right first and second parallel rod (B20, B21) is respectively installed on the bottom surface of the right pedal (B10) near the front end and the rear end.

Figure 6:
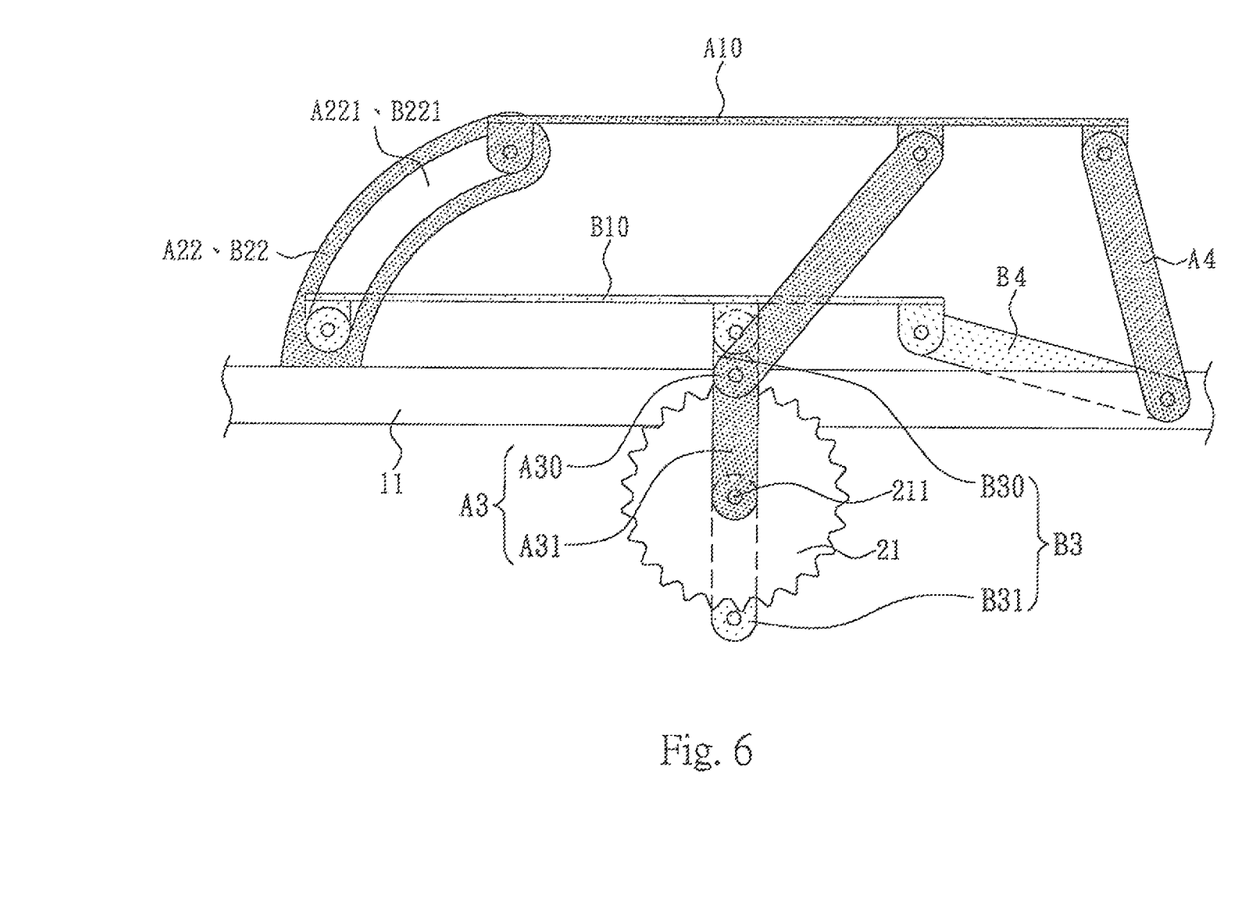
FIG. 6 is a partial schematic view of a fifth embodiment in the present invention.

A fifth embodiment as shown in FIG. 6, the left pedal mechanism (A), comprising a left pedal (A10), a left connecting rod (A4), a left guide bracket (A22), and a left driving connecting rod assembly (A3);

wherein the left connecting rod (A4) having one end thereof is pivotally connected with the left pedal (A10) adjacent to a rear end or a front end, and the opposite end is pivotally connected with the deck (11) adjacent to the rear end or a front end; wherein the left guide bracket (A22) is installed on a top surface of the deck (11) adjacent to the front end or rear end and opened with a left guide groove (A221) disposed near one end to the other end thereof wherein the left pedal (A10) near the front end or the rear end pivotally is installed in the left guide groove (A221) so that the left pedal (A10) can be pivotally installed on a left side of the deck (11) adjacent to the middle section; wherein the left driving connecting rod assembly (A3) having adjacent ends thereof is connected to each other and non-adjacent ends thereof is respectively connected to the left pedal (A10) near a middle section and the center axle (211); and The right pedal mechanism (B), comprising a right pedal (B10), a right connecting rod (B4), a right guide bracket (B22), and a right driving connecting rod assembly (B3);

wherein the right connecting rod (B4) having one end thereof is pivotally connected with the right pedal (B10) adjacent to a rear end or a front end, and the opposite end is pivotally connected with the deck (11) adjacent to the rear end or the front end; wherein the right guide bracket (B22) is installed on the top surface of the deck (11) adjacent to the front end or rear end and opened with a right guide groove (B221) disposed near one end to the other end thereof; wherein the right pedal (B10) near the front end or the rear end pivotally is installed in the right guide groove (B221) so that the right pedal (B10) can be pivotally installed on a right side of the deck (11) adjacent to the middle section; wherein the right driving connecting rod assembly (B3) having adjacent ends thereof is connected to each other and non-adjacent ends thereof is respectively connected to the right pedal (B10) near a middle section and the center axle (211). The total length of the right first driving rod (B30) and the right second driving rod (B31) is different from the total length of the left first driving rod (A30) and the left second driving rod (A31).

When the actual operation, it can also, as required, make the length of the left second driving rod (A31) connected to the center axle (211) equal to the length of the right second driving rod (B31) connected to the center axle (211), and make the length, of the left first driving rod (A30) connected to the left pedal (A10) differ from the length of the right first driving rod (B30) connected to the right pedal (B10), meanwhile, one end of the left and right connecting rod (A4, B4) is respectively connected with the bottom surface of the left and right pedal (A10, B10) near the rear end (or the front end), and the non-adjacent ends of the left first driving rod (A30) and the left second driving rod (A31) are respectively connected to the bottom surface of the left pedal (A10) near the middle section and the center axle (211); the non-adjacent ends of the right first driving rod (B30) and the right second driving rod (B31) are respectively connected to the bottom surface of the right pedal near the middle section and the center axle (211), making the left and right pedals (A10, B10) for the best support.

In the fifth embodiment, when the left and the right guide bracket (A22, B22) are installed on the top surface of the deck (11) near the front end, the length of the left and the right guide bracket (A22, B22) is shorter than the length of the corresponding left and the right connecting rod (A4, B4); the length of the left and the right connecting rod (A4, B4) is shorter than the length, of the corresponding left and the right guide bracket (A22, B22), such that the left and right pedal (A10, B10) can be installed forward on both sides of the deck (11) near the middle section for the convenience of the rider to step thereon.

Figure 7:
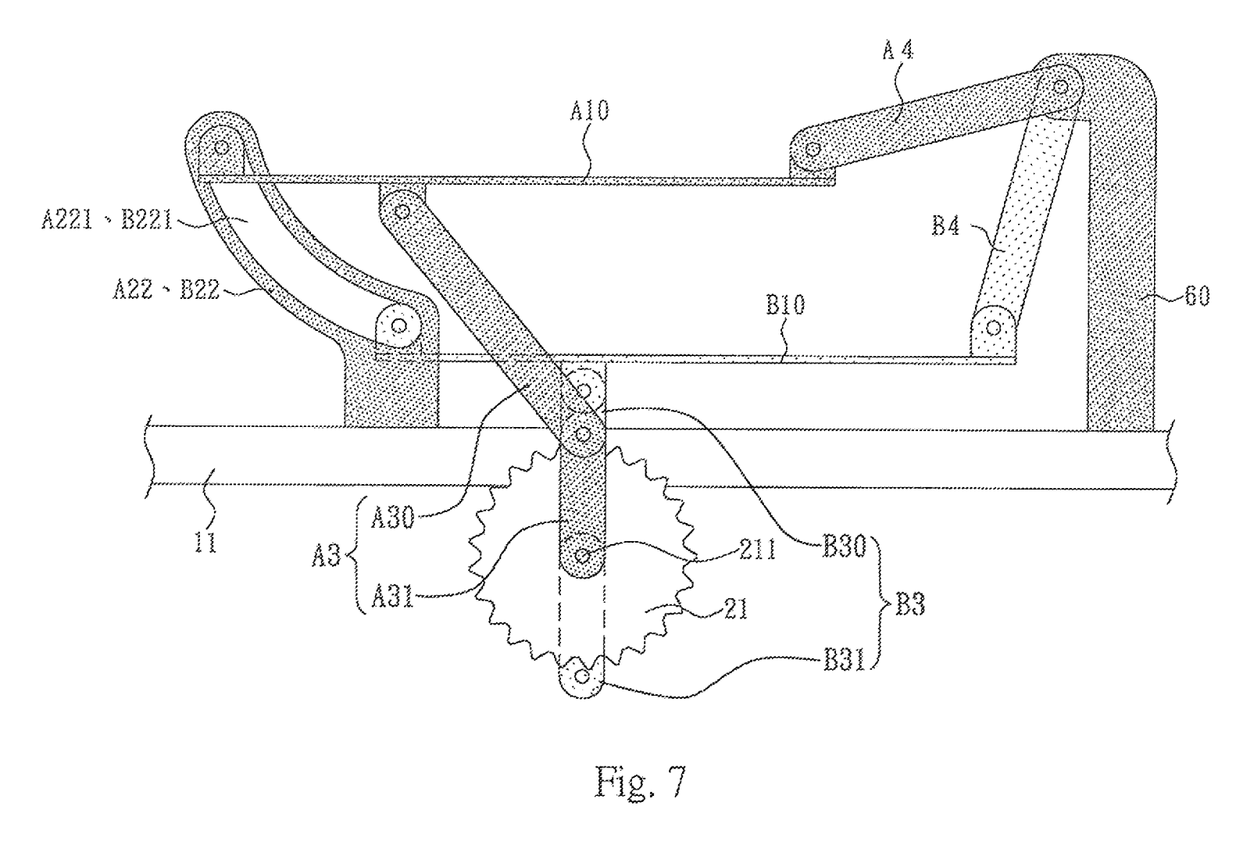
FIG. 7 is a partial schematic view of a sixth embodiment in the present invention.

In a sixth embodiment as shown in FIG. 7, wherein the deck (11) further comprises a supporting post (60) disposed at the top surface near the rear end (or the front end) thereof, and a location close to a top end of the supporting post (60) being connected with one end of the left connecting rod (A4) and the right connecting rod (A5); the opposite end of the left and right connecting rod (A4, B4) is respectively connected to the top surface of the left and the right pedal (A10, B10) near the rear end (or front end); and the non-adjacent ends of the left first driving rod (A30) and the left second driving rod (A31) are respectively connected to the bottom surface of the left pedal (A10) near the middle section and the center axle (211); the non-adjacent ends of the right first driving rod (B30) and the right second driving rod (B31) are respectively connected to the bottom surface of the right pedal near the middle section and the center axle (211).

When the actual operation, it can also, as required, make one end of the left and right connecting rod (A4, B4) is respectively connected to the bottom surface of the left and right pedal (A10, B10) near the rear end (or the front end).

In the previous embodiments, although applying in the case of scooter, the present invention can apply in other fields, such as bikes, treadmills, or other exercise equipment according to production needs. Besides, the total length of the right driving connecting rod can equal to the total length of the left driving connecting rod so that Scooter can also have forward momentum.

I claim:

1. A pedal scooter transmission mechanism, the transmission mechanism (20) applied in a pedal scooter (10), the pedal scooter (10) comprising:
a deck (11); a front tube (12) disposed in a front end of the deck (11); a front fork (13) disposed on the front tube (12); a handle (14) disposed at a top end of the front fork (13); at least a front wheel (15) disposed at a bottom end of the front fork (13), whereby the handle (14) can control the direction of the front wheel (15) through the front fork (13); a rear fork (16) disposed at a rear end of the deck (11); and at least a rear wheel (17) disposed at a bottom end of the rear fork (16), wherein the rear wheel (17) comprises a driven chainring (1.71) disposed at a center thereof, whereby the front wheel (15) and the rear wheel (17) can be rotated on the ground when supporting the deck (11) and loading thereon;
the transmission mechanism (20) comprising:
a driving chainring (21) having a center axle (211) pivotally connected to a proximity of a middle section of the deck (11), wherein the driving chainring (21) is connected with the driven chainring (171) via a transmission element (22), when the center axle (211) drives the driving chainring (21) to rotate, the driving chainring (21) further drives the driven chainring to rotate by mean of the transmission element (22);
a left pedal mechanism (A), comprising a left pedal (A10), a left parallel connecting rod assembly (A2), and a left driving connecting rod assembly (A3);
wherein the left parallel connecting rod assembly (A2) having one end thereof is respectively connected to the left pedal (A10) near a front end and a rear end, and the opposite end thereof respectively connected to the deck (11) adjacent to the front end and the rear end, whereby the left pedal (A10) can be pivotally installed on the deck (11) adjacent to a left middle section; wherein the left driving connecting rod assembly (A3) having adjacent ends thereof is connected to each other and non-adjacent ends thereof is respectively connected to the left pedal (A10) near a middle section and the center axle (211); and
a right pedal mechanism (B), comprising a right pedal (B10), a right parallel connecting rod assembly (B2), and a right driving connecting rod assembly (B3);
wherein the right parallel connecting rod assembly (B2) having one end thereof is respectively connected to the right pedal (B10) adjacent to a front end and a rear end, and having the opposite end thereof respectively connected to the deck (11) adjacent to the front end and the rear end, whereby the right pedal (B10) can be pivotally installed on the deck (11) adjacent to a right middle section; wherein the right driving connecting rod assembly (B3) having adjacent ends thereof is connected to each other, and having the opposite ends thereof is respectively connected to the right pedal (B10) adjacent to a middle section and the center axle (211).

2. The pedal scooter transmission mechanism of claim 1, wherein the left and the right driving connecting rod assembly (A3, B3) are different in total length.

3. The pedal scooter transmission mechanism of claim 2, wherein the left driving connecting rod assembly (A3) comprises a left first driving rod (A30) and a left second driving rod (A31); wherein the right driving connecting rod assembly (B3) comprises a right first driving rod (B30) and a right second driving rod (B31); wherein the length of the left second driving rod (A31) is the same as the right second driving rod (B31); wherein the length of the left first driving rod (A30) is different from the length of the right first driving rod (B30).

4. The pedal scooter transmission mechanism of claim 3, wherein the left parallel connecting rod assembly (A2) comprises a left first parallel rod (A20) pivotally connected with the corresponding left pedal (A10) adjacent to the front end and a left second parallel rod (21) pivotally connected with the corresponding left pedal (A10) adjacent to the rear end; wherein the right parallel connecting rod assembly (B2) comprises a right first parallel rod (B20) pivotally connected with the corresponding right pedal (B10) adjacent to the front end and a right second parallel rod (B21) pivotally connected with the corresponding right pedal (B10) adjacent to the rear end; wherein the length of the left and right first parallel rod (A20, B20) is shorter than the length of the left and right second parallel rod (A21, B21).

5. The pedal scooter transmission mechanism of claim 4, wherein the left and the right first driving rod (A30, B30) are respectively connected with a bottom surface of the corresponding left pedal and right pedal (A10, B10).

6. The pedal scooter transmission mechanism of claim 5, wherein one end of the left parallel connecting rod assembly (A2) is respectively connected with the corresponding left pedal (A10) adjacent to a bottom front end and a bottom rear end; wherein one end of the right parallel connecting rod assembly (B2) is respectively connected with the corresponding right pedal (B10) adjacent to a bottom front end and a bottom rear end.

7. The pedal scooter transmission mechanism of claim 5, wherein one end of the left parallel connecting rod assembly (A2) is respectively connected with the corresponding left pedal (A10) adjacent to a top front end and a top rear end; wherein one end of the right parallel connecting rod assembly (B2) is respectively connected with the corresponding right pedal (B10) adjacent to a top front end and a top rear end.

8. The pedal scooter transmission mechanism of claim 6, wherein the deck (11) further comprises at least one of the following or a combination thereof disposed on a top surface: a front supporting post (40) and a rear supporting post (50);
the front supporting post (40) being installed on the top surface of the deck (11) adjacent to the front end, and a location close to a top end of the front supporting post (40) being connected with one end of the left first and right first parallel connecting rod (A20, B20);
the rear supporting post (50) being installed on the top surface of the deck (11) adjacent to the rear end, and a location close to a top end of the rear supporting post (50) being connected with one end of the left second and right second parallel connecting rod (A21, B21).

9. The pedal scooter transmission mechanism of claim 8, wherein the corresponding ends of the left first parallel rod (A20) of the left parallel connecting rod (A2) and the right first parallel rod (B20) of the right parallel connecting rod (B2) are connected with each other; wherein the corresponding ends of the left second parallel rod (A21) of the left parallel connecting rod (A2) and the right second parallel rod (B21) of the right parallel connecting rod (B2) are connected with each other.

10. A pedal scooter transmission mechanism, the transmission mechanism (20) applied in a pedal scooter (10), the pedal scooter (10) comprising:
a deck (11); a front tube (12) disposed in a front end of the deck (11); a front fork (13) disposed on the front tube (12); a handle (14) disposed at a top end of the front fork (13); at least a front wheel (15) disposed at a bottom end of the front fork (13), whereby the handle (14) can control the direction of the front wheel (15) through the front fork (13); a rear fork (16) disposed at a rear end of the deck (11); and at least a rear wheel (17) disposed at a bottom end of the rear fork (16), wherein the rear wheel (17) comprises a driven chainring (171) disposed at a center thereof, whereby the front wheel (15) and the rear wheel (17) can be rotated on the ground when supporting the deck (11) and loading thereon;
the transmission mechanism (20) comprising:
a driving chainring (21) having a center axle (211) pivotally connected to a proximity of a middle section of the deck (11), wherein the driving chainring (21) is connected with the driven chainring (171) via a transmission element (22), when the center axle (211) drives the driving chainring (21) rotating, the driving chainring (21) further drives the driven chainring rotating by the transmission element (22);
a left pedal mechanism (A), comprising a left pedal (A10), a left connecting rod (A4), a left guide bracket (A22), and a left driving connecting rod assembly (A3);
wherein the left connecting rod (A4) having one end thereof is pivotally connected with the left pedal (A10) adjacent to a rear end or a front end, and the opposite end is pivotally connected with the deck (11) adjacent to the rear end or a front end; wherein the left guide bracket (A22) is installed on a top surface of the deck (11) adjacent to the front end or rear end and opened with a left guide groove (A221) disposed near one end to the other end thereof; wherein the left pedal (A10) near the front end or the rear end pivotally is installed in the left guide groove (A221) so that the left pedal (A10) can be pivotally installed on a left side of the deck (11) adjacent to the middle section; wherein the left driving connecting rod assembly (A3) having adjacent ends thereof is connected to each other and non-adjacent ends thereof is respectively connected to the left pedal (A10) near a middle section and the center axle (211); and
a right pedal mechanism (B), comprising a right pedal (B10), a right connecting rod (B4), a right guide bracket (B22), and a right driving connecting rod assembly (B3);
wherein the right connecting rod (B4) having one end thereof is pivotally connected with the right pedal (B10) adjacent to a rear end or a front end, and the opposite end is pivotally connected with the deck (11) adjacent to the rear end or the front end; wherein the right guide bracket (B22) is installed on the top surface of the deck (11) adjacent to the front end or rear end and opened with a right guide groove (B221) disposed near one end to the other end thereof; wherein the right pedal (B10) near the front end or the rear end pivotally is installed in the right guide groove (B221) so that the right pedal (B10) can be pivotally installed on a right side of the deck (11) adjacent to the middle section; wherein the right driving connecting rod assembly (B3) having adjacent ends thereof is connected to each other and non-adjacent ends thereof is respectively connected to the right pedal (B10) near a middle section and the center axle (211).

11. The pedal scooter transmission mechanism of claim 10, wherein the left and the right driving connecting rod assembly (A3, B3) are different in total length.

12. The pedal scooter transmission mechanism of claim 11, wherein the left driving connecting rod assembly (A3) comprises a left first driving rod (a) and a left second driving rod (A31); wherein the right driving connecting rod assembly (B3) comprises a right first driving rod (B30) and a right second driving rod (B31); wherein the length of the left second driving rod (A31) is the same as the right second driving rod (B31); wherein the length of the left first driving rod (A30) is different from the right first driving rod (B30).

13. The pedal scooter transmission mechanism of claim 12, wherein the left and the right first driving rod (A30, B30) are respectively connected with a bottom surface of the corresponding left pedal and right pedal (A10, B10).

14. The pedal scooter transmission mechanism of claim 13, wherein one end of the left connecting rod (A4) and the right connecting rod (B4) is respectively connected with the corresponding left pedal (A10) and the corresponding right pedal (B10) adjacent to one of the following: a bottom front end, a bottom rear end, a top front end, a top rear end.

15. The pedal scooter transmission mechanism of claim 14, wherein the deck (11) further comprises a supporting post (60) disposed at a top surface near the rear end thereof, and a location close to a top end of the supporting post (60) being connected with one end of the left connecting rod (A4) and the right connecting rod (A5).

16. The pedal scooter transmission mechanism of claim 15, wherein the length of the left and the right guide bracket (A22, B22) is shorter than the length of the corresponding left and the right connecting rod (A4, B4), when the left and the right guide bracket (A22, B22) are installed on the top surface of the deck (11) near the front end.

17. The pedal scooter transmission mechanism of claim 16, wherein the length of the left and the right connecting rod (A4, B4) is shorter than the length of the corresponding left and the right guide bracket (A22, B22).

* * * * *